US006929402B1

(12) United States Patent
Titus

(10) Patent No.: US 6,929,402 B1
(45) Date of Patent: Aug. 16, 2005

(54) JOURNAL BEARING AND THRUST PAD ASSEMBLY

(75) Inventor: David G. Titus, West Boylston, MA (US)

(73) Assignee: Morgan Construction Company, Worcester, MA (US)

( * ) Notice: Subject to any disclaimer, the term of this patent is extended or adjusted under 35 U.S.C. 154(b) by 304 days.

(21) Appl. No.: 10/390,430

(22) Filed: Mar. 17, 2003

Related U.S. Application Data

(60) Provisional application No. 60/371,959, filed on Apr. 11, 2002.

(51) Int. Cl.$^7$ ............................................. F16C 17/10

(52) U.S. Cl. ..................... 384/107; 384/295; 384/416; 384/420

(58) Field of Search ..................... 384/107, 112, 295, 384/416, 420; 74/339, 333, 325

(56) References Cited

U.S. PATENT DOCUMENTS

| 2,096,304 | A | * | 10/1937 | Lapsley ..................... 384/275 |
| 2,161,768 | A | | 6/1939 | Smitmans |
| 3,078,975 | A | * | 2/1963 | Eaton ......................... 74/339 |
| 4,823,631 | A | * | 4/1989 | Kishimoto ................... 74/339 |
| 4,884,899 | A | | 12/1989 | Schwartzman |
| 5,265,964 | A | | 11/1993 | Hooper |
| 5,363,557 | A | | 11/1994 | Thompson et al. |
| 5,427,455 | A | | 6/1995 | Bosley |
| 5,529,399 | A | * | 6/1996 | Holze ......................... 384/107 |

* cited by examiner

Primary Examiner—Thomas R. Hannon
(74) Attorney, Agent, or Firm—Gauthier & Connors LLP

(57) ABSTRACT

An apparatus for rotatably mounting and axially fixing a gear on a shaft comprises a bushing fixed within a bore of the gear. A sleeve is received on and fixed relative to the shaft. The sleeve is surrounded by and journalled for rotation within the bushing. A thrust ring is fixed relative to and projects radially from the shaft on one side of the gear. A retainer on the one side of the gear defines a circular channel within which the annular thrust ring is axially confined.

13 Claims, 7 Drawing Sheets

JOURNAL BEARING AND THRUST PAD ASSEMBLY

This application claims benefit of 60/371,959 filed Apr. 11, 2002.

BACKGROUND OF THE INVENTION

1. Field of the Invention

This invention relates generally to heavy duty gear boxes of the type found in the drive trains of rolling mills, where clutches are employed to alternatively engage and disengage gears from their respective support shafts, and is concerned in particular with the bearing assemblies for mounting the gears on the shafts.

2. Description of the Prior Art

In arrangements of the type referred to above, when the gears are disengaged, they are free to rotate or "free wheel" with respect to their support shafts. However, when in the engaged mode, the gears are fixed with respect to their support shafts and are subjected to axial loading incidental to the driving forces being delivered to or received from other gears.

In the past, roller thrust bearings have been employed to mount the gears on their respective support shafts. The roller thrust bearings are ideally suited for supporting the gears when they are disengaged and free wheeling. It has now been determined, however, that when the gears are fixed with respect to their support shafts in the engaged mode, and the bearings are thus in a static condition, the axial loading on the gears causes the roller elements and races of the bearings to undergo accelerated localized wear in the regions where they are in frictional contact with one another. This localized wear eventually creates clearances which exceed acceptable tolerances, causing vibrations and necessitating a shut down of the equipment and replacement of the prematurely worn bearings.

SUMMARY OF THE INVENTION

In accordance with the present invention, the conventional roller thrust bearings are replaced by combinations of sleeve bearings and thrust ring assemblies. The sleeve bearings provide radial support for the gears in both the engaged and disengaged modes of operation. The thrust ring assemblies absorb axial loads under static conditions when the gears are fixed with respect to their support shafts.

These and other features and advantages of the present invention will now be described in greater detail with reference to the accompanying drawings, wherein:

DETAILED DESCRIPTION OF ILLUSTRATED EMBODIMENT

Figure 1:
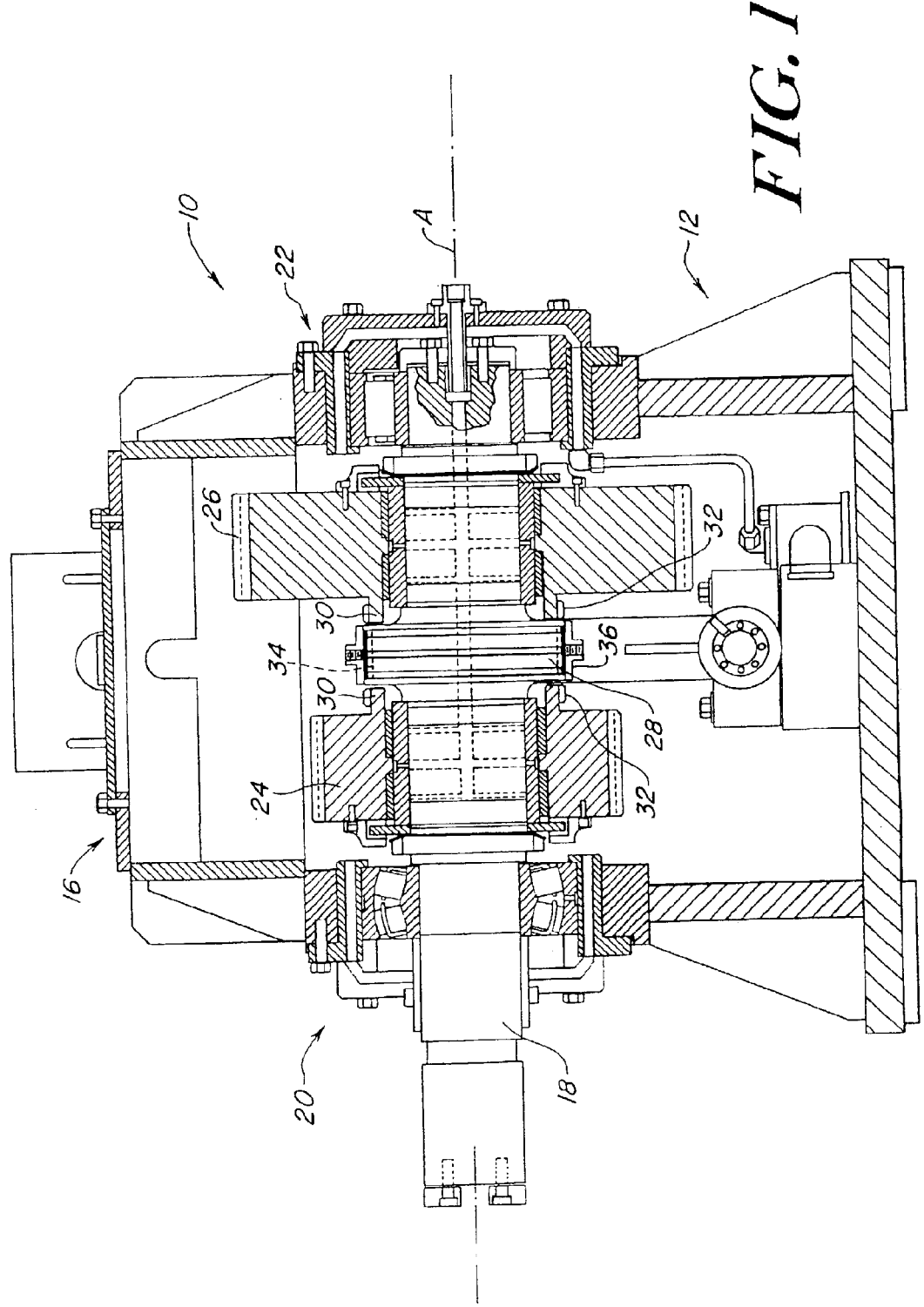
FIG. 1 is a sectional view taken through a heavy duty gear box of the type employed in rolling mills.

With reference initially to FIGS. 1, 2, 3A and 3B, a rolling mill gear box is shown at 10. The gear box includes a housing having a base section 12 and cover 16. A shaft 18 is mounted in the housing between bearings 20, 22 for rotation about an axis "A". One end of the shaft protrudes from the housing for connection to a mill drive (not shown).

Gears 24, 26 are carried on the shaft on opposite sides of an enlarged diameter shaft collar 28. The gears have different diameters and numbers of teeth, and are thus capable of meshing with other mating gears in the gear box (not shown) to accommodate different drive ratios.

The gears 24, 26 are each provided with clutch collars 30 having teeth 32 which may be rotatably aligned with external splines 34 on the shaft collar 28. A sleeve 36 internally splined as at 37 is mounted on the shaft collar 28. Sleeve 36 is axially shiftable between a neutral position as shown in FIG. 1 and the upper portion of FIG. 2 and FIG. 3A, and an engaged position at which its internal splines 37 are engaged with the teeth 32 of one or the other of the clutch collars 30 on the gears 24, 26. The lower portion of FIG. 2 and FIG. 3B show the sleeve 36 shifted to an engaged position.

Thus, when the clutch sleeve is in the neutral position, both gears 24 and 26 are disengaged from the shaft 18 and as such are in a free wheeling mode. When the sleeve 36 is shifted into engagement with the clutch teeth 32 of one gear, that gear is engaged with the shaft, allowing the other gear to remain in a free wheeling mode.

The gears 24, 26 are mounted on the shaft 18 with mirror image combinations of sleeve bearings and thrust ring assemblies. Thus, the description will now proceed with reference to the mounting of gear 26, it being understood that the same description applies to the mounting of the other gear 24.

Figure 2:
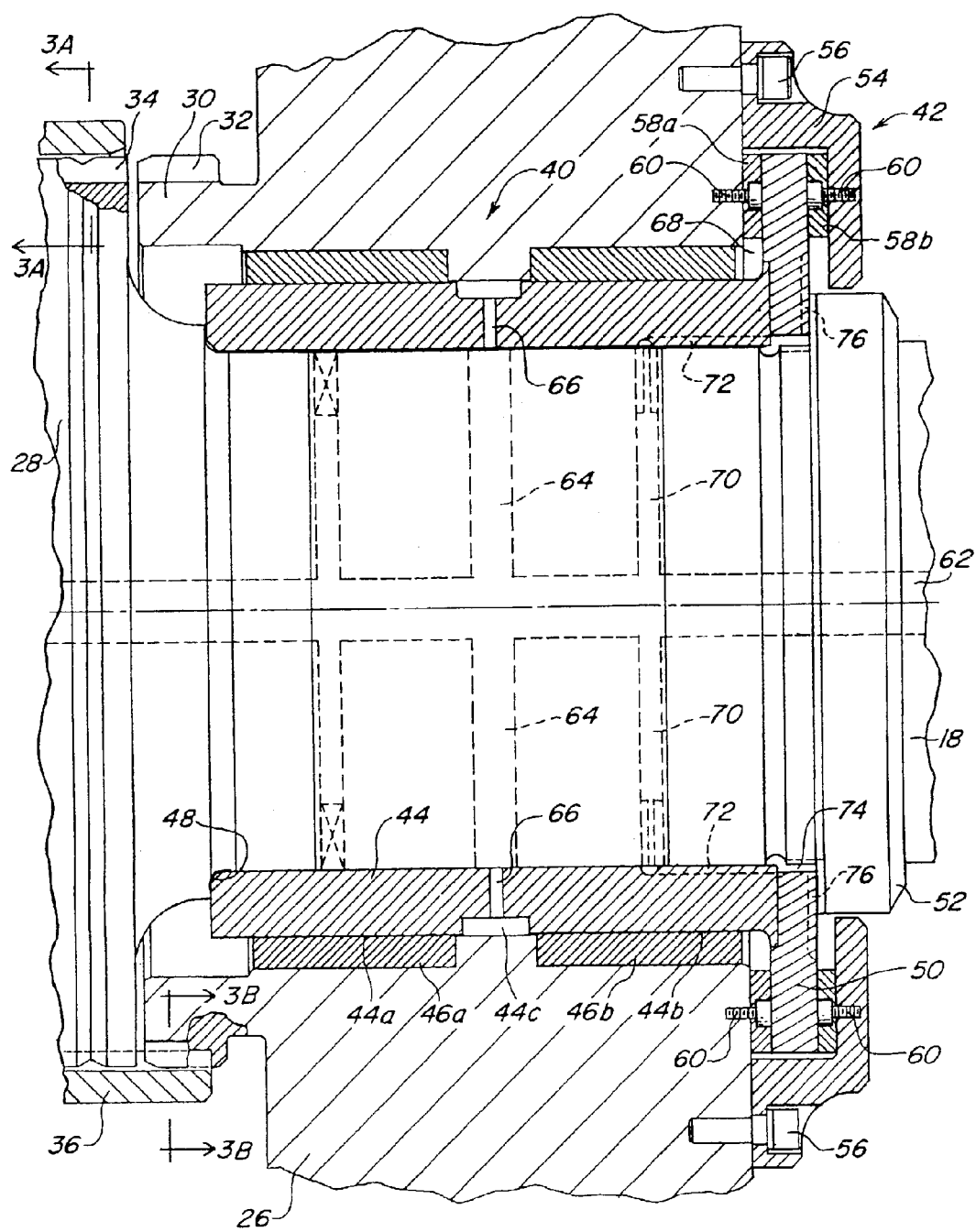
FIG. 2 is an enlarged view of a portion of the gear box depicted in FIG. 1.
Figure 3A:
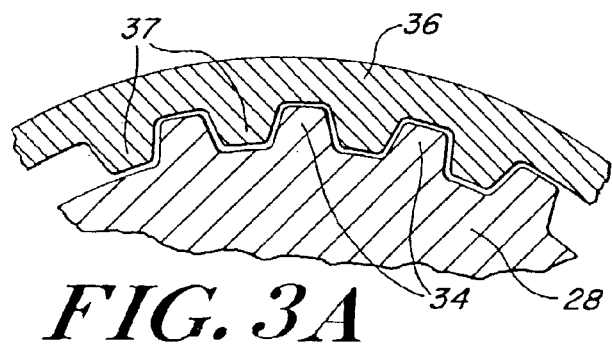
FIGS. 3A and 3B are partial sectional views taken along lines 3A—3A and 3B—3B of FIG. 2.
Figure 3B:
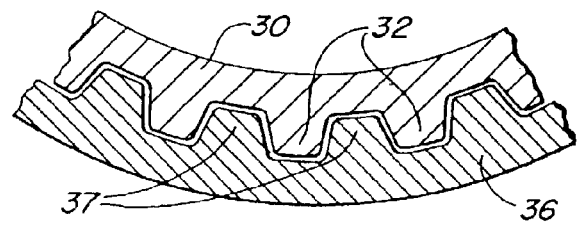

As can best be seen in FIG. 2, gear 26 is mounted on and journalled for rotation with respect to the shaft 18 by means of a sleeve bearing generally indicated at 40. Gear 26 is also fixed axially with respect to the shaft by means of a thrust ring assembly generally indicated at 42.

The sleeve bearing 40 includes a sleeve 44 received on the shaft 18. The sleeve has twin bearing surfaces 44a, 44b separated by a central groove 44c and journalled for rotation within bushings 46a, 46b received within a stepped bore of the gear 26.

Figure 8:
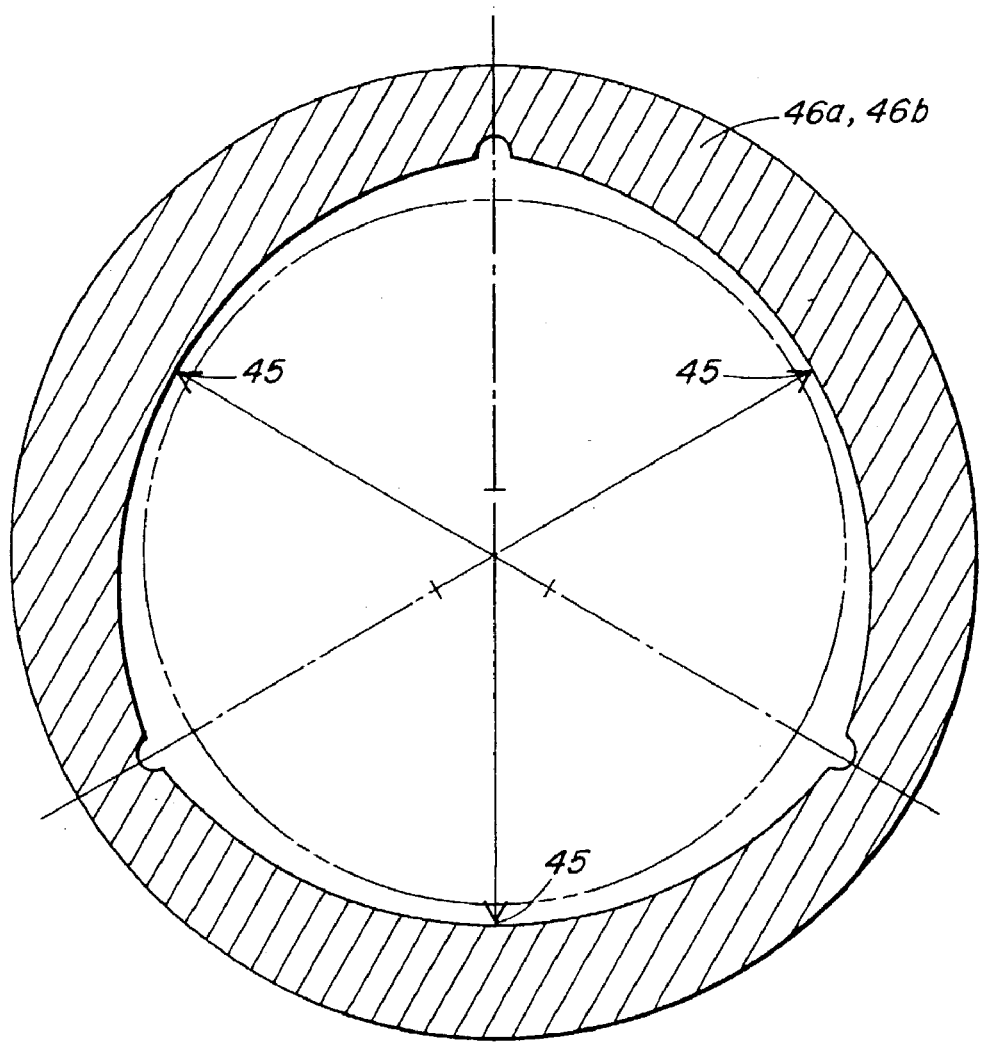
FIG. 8 is a schematic view, with exaggerated dimensions, showing the lobed internal configuration of the bushings.

Preferably, as shown somewhat diagrammatically in FIG. 8, the interiors of the bushings 46a, 46b are lobed as at 45 at circumferentially spaced intervals. When the gears are in a free wheeling mode, this lobed bushing configuration provides angularly spaced zones of increased lubricant pressure that contribute to bearing stability.

One end of the sleeve 44 abuts a shoulder 48 on the shaft, and a thrust ring 50 is urged against the other end of the sleeve by a nut 52 threaded onto the shaft.

The thrust ring assembly 42 includes the thrust ring 50 and a collar 54 secured to a flank of the gear 26 by screws 56. Thrust ring 50 is captured between annular bearing plates 58a, 58b secured by screws 60 respectively to the outboard flank of gear 26 and the inboard face of collar 54. The opposite faces of the thrust ring 50 define annular first bearing surfaces, and the confronting surfaces of the plates 58a, 58b define annular second bearing surfaces.

Liquid lubricant is introduced via a passageway 62 extending centrally through the shaft 18. Branch passageways 64 in the shaft and radial bores 66 in the sleeve 44 deliver the lubricant to the groove 44c. The lubricant emerges from groove 44c to lubricate the interface between the sleeve bearing surfaces 44a, 44b and the bushings 46a, 46b before escaping in one direction towards the shaft shoulder 48 and in the opposite direction into circular channel 68 on one side of the thrust ring 50.

Other branch passageways 70 in the shaft direct lubricant to internal grooves 72 in the sleeve 44. Grooves 72 lead to a circular channel 74 inside the thrust ring. From here, the lubricant is delivered via grooves 76 to the opposite side of the thrust ring 50.

The lubricant delivered to opposite sides of the thrust ring serves to lubricate the interface between the first bearing surfaces defined by the opposite faces of the thrust ring 50 and the second bearing surfaces defined by the confronting surfaces of the bearing plates 58*a*, 58*b*.

Figure 4:
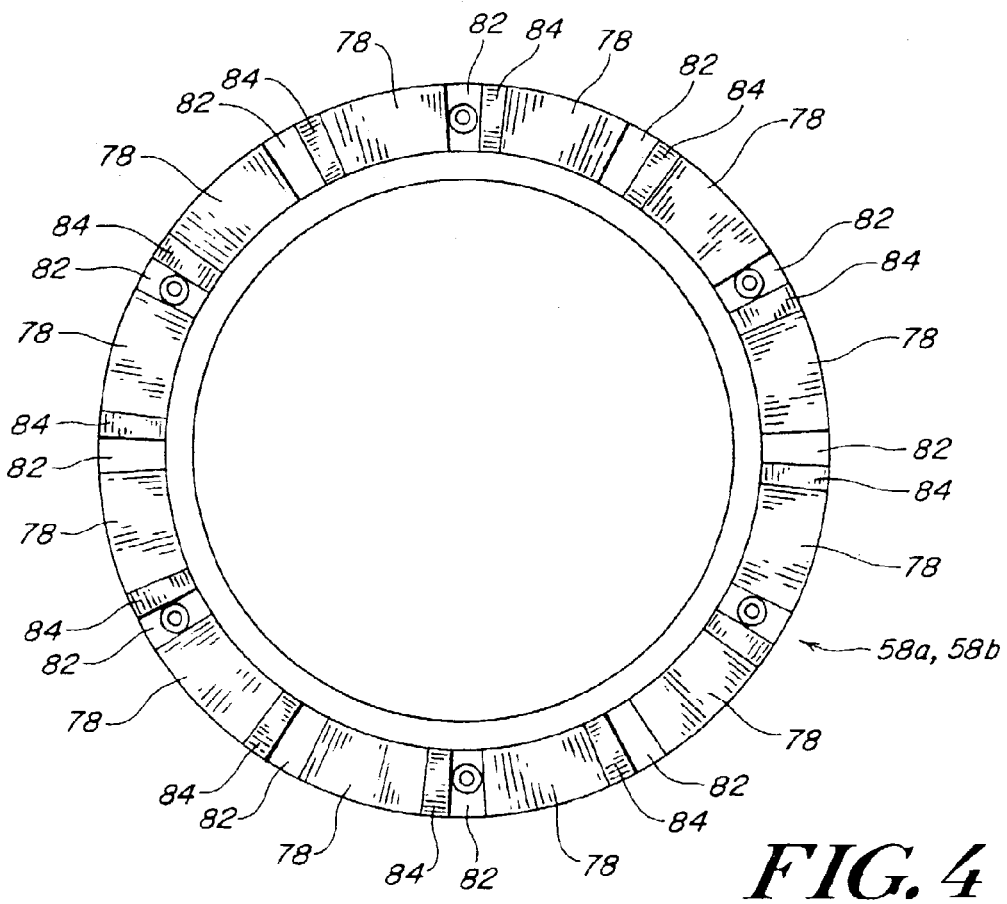
FIG. 4 is a front view showing the bearing surface of one of the bearing plates.
Figure 5:
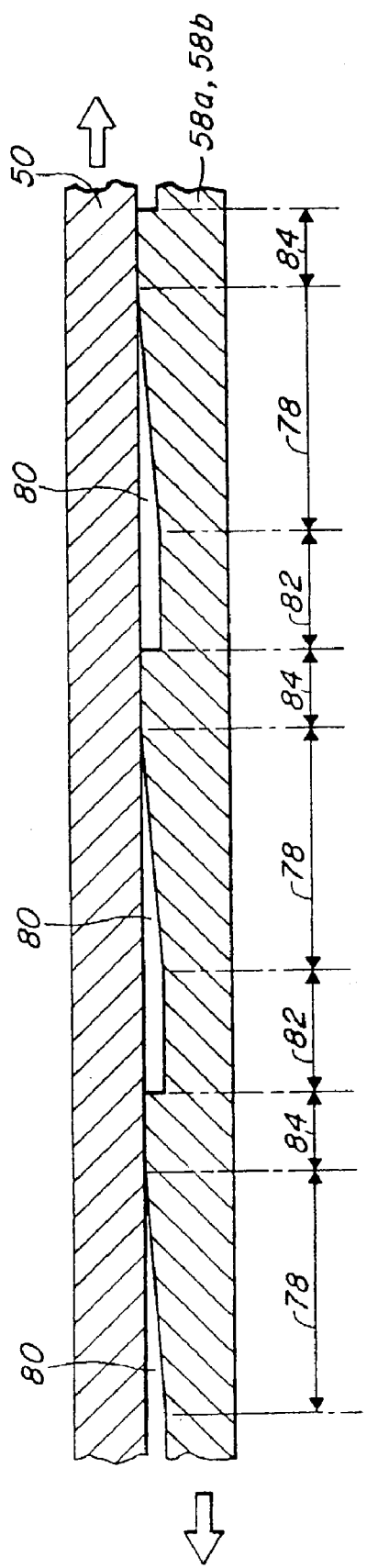
FIG. 5 is a partial side view on an enlarged scale of the bearing plate shown in FIG. 4.

The second bearing surfaces of the annular bearing plates 58*a*, 58*b* are mirror images of each other. With reference additionally to FIGS. 4 and 5, it will be seen that each second bearing surface is configured with a plurality of circumferentially spaced ramps 78 arranged to coact with the adjacent first bearing surface of the thrust ring 50 to define wedged shaped pockets 80 therebetween. Each ramp 78 extends circumferentially from a recess 82 at one end to a flat land 84 at the opposite end. With this arrangement, relative rotation in the directions indicated diagrammatically by the arrows in FIG. 5 between the thrust ring 50 and the annular plates 58*a*, 58*b* in the free wheeling mode will produce angularly spaced zones of elevated lubricant pressure which will beneficially reduce frictional wear. A similar condition exists even when a gear is engaged, because although its associated first and second bearing surfaces are rotationally fixed with respect to each other, they continue to rotate in concert relative to the liquid lubricants.

Figure 6:
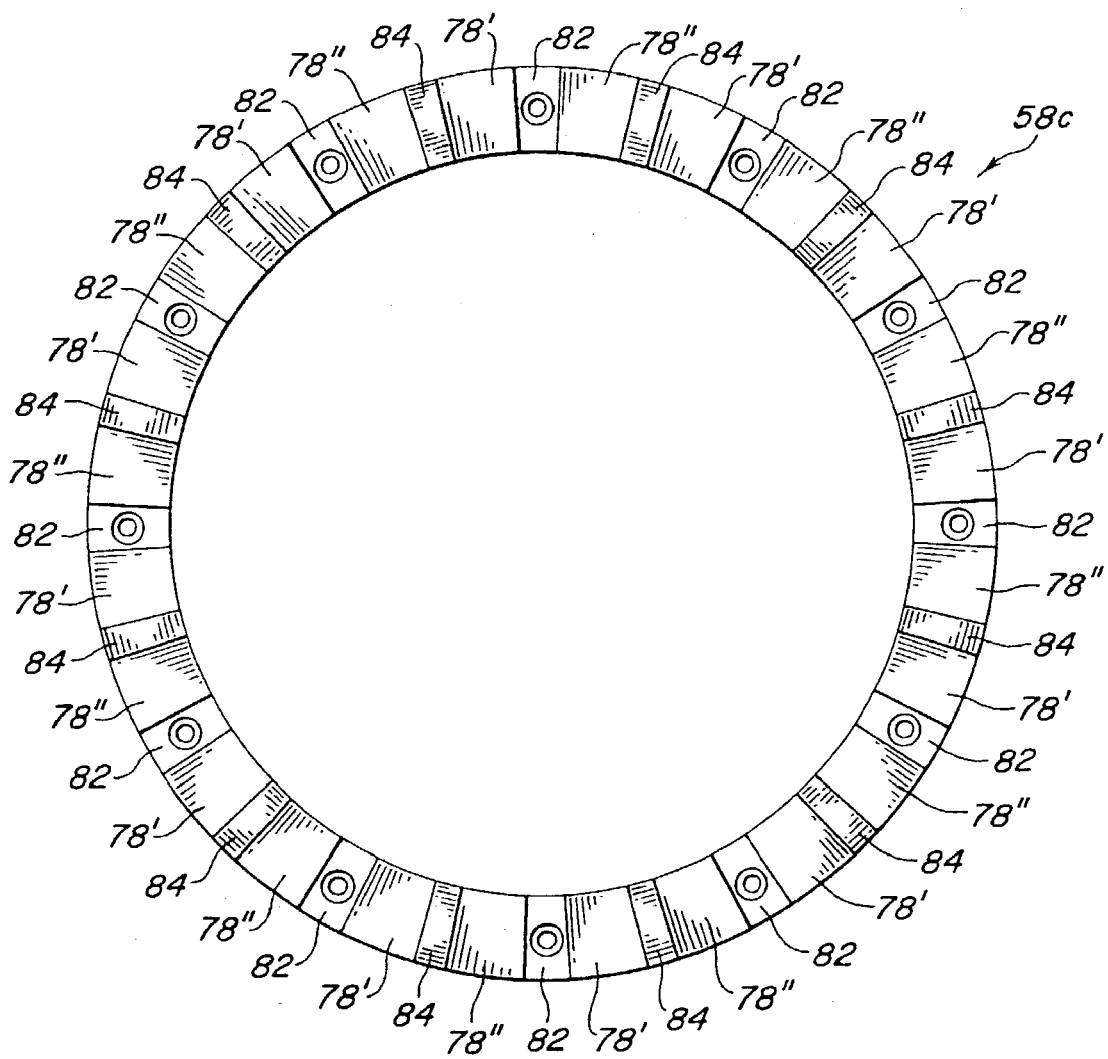
FIGS. 6 and 7 are views respectively similar to FIGS. 4 and 5, showing an alternative embodiment of a bearing plate.
Figure 7:
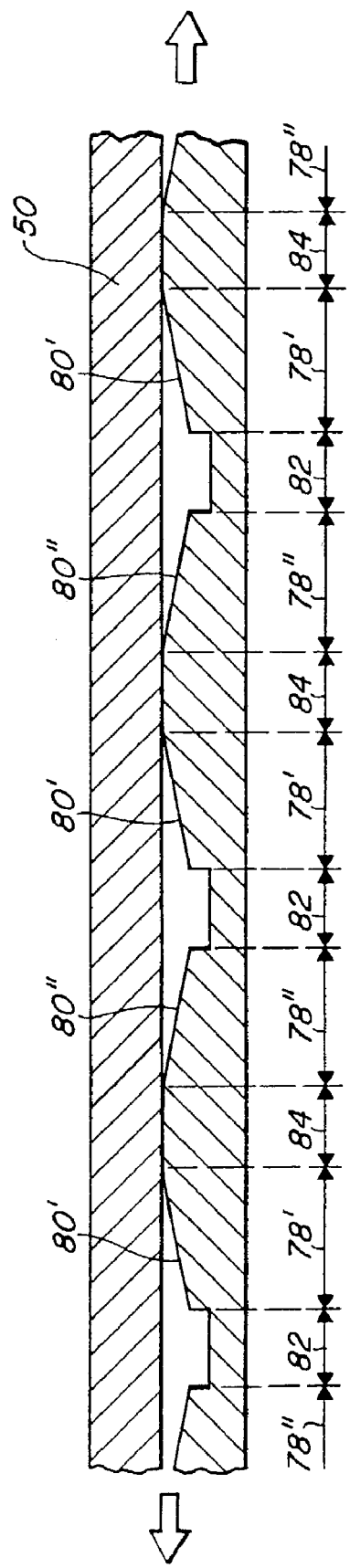

As an alternative to providing two bearing plates 58*a*, 58*b* with mirror image second bearing surfaces and as shown in FIGS. 6 and 7, a modified plate 58*c* may be provided for use on opposite sides of the thrust ring 50. The second bearing surface of bearing plate 58*c* is configured with oppositely inclined ramps 78', 78" arranged to coact with the adjacent bearing surfaces of thrust ring 50 to define wedge shaped pockets 80', 80" therebetween. The ramps 78', 78" are circumferentially spaced by flat lands 84 from which they descend to recesses 82. The ramps 78' and their associate pockets 80' are designed to produce angularly spaced zones of elevated lubricant pressure on one side of the ring 50, and the ramps 78" and their associated pockets 80" are likewise designed to produce the same effect on the opposite side of the ring 50.

In light of the foregoing, it will now be understood by those skilled in the art that the sleeve bearings 40 operate effectively to rotatably support the gears 24, 26 in the free wheeling mode, with the thrust ring assemblies 42 being efficiently lubricated to minimize frictional wear. When one or the other of the gears is rotationally fixed to the shaft, its sleeve bearing provides continued static radial support, and axial loads are taken up by the associated thrust ring assembly 42 which acts over its entire circumference.

It will additionally be appreciated by those skilled in the art that within the bearing assemblies, heat generation increases with increasing rotational speed. However, increasing rotational speed produces an increased lubricant flow through the radial passageways 64, 70 to their respective points of lubrication, the net effect being to maintain a substantially constant and tolerable bearing temperature over a wide range of operating speeds.

I claim:

1. Apparatus for rotatably mounting and axially fixing a gear on a shaft said apparatus comprising:
   a bushing fixed within a bore of said gear;
   a sleeve received on and fixed relative to said shaft, said sleeve being surrounded by and journalled for rotation within said bushing;
   a thrust ring fixed relative to and projecting radially from said shaft on one side of said gear; and
   retainer means on the said one side of said gear for defining a circular channel within which said annular thrust ring is axially confined.

2. The apparatus of claim 1 further comprising means for introducing a liquid lubricant between said sleeve and said bushing, and into the circular channel defined by said retainer means.

3. The apparatus of claims 1 or 2 wherein said retainer means comprises confronting axially spaced annular plates configured and arranged to contact opposite faces of said thrust ring, one of said annular plates being secured to the said one side of said gear, and the other of said annular plates being carried on a circular collar secured to the said one side of said gear.

4. The apparatus of claim 1 wherein said thrust ring has oppositely facing annular first bearing surfaces axially confined between annular second bearing surfaces on said retainer means.

5. The apparatus of claim 4 further comprising means for introducing a liquid lubricant between said first and second bearing surfaces.

6. The apparatus of claim 5 wherein said first and second bearing surfaces are configured and arranged to respond to relative rotation between said thrust ring and retainer means by distributing the liquid lubricant introduced between said first and second bearing surfaces into a plurality of angularly spaced zones of elevated pressure.

7. The apparatus of claim 5 wherein said first and second bearing surfaces are annular and arranged in confronting pairs, and wherein one of the bearing surfaces of each pair is configured with a plurality of circumferentially spaced ramps arranged to coact with the other bearing surface of each pair in defining circumferentially spaced wedge-shaped pockets therebetween.

8. The apparatus of claim 7 wherein each of said ramps extends circumferentially from a recess at one end to a flat land at the opposite end, with successive ramps being separated one from the other by adjacently disposed recesses and lands.

9. The apparatus of claim 7 wherein each of said ramps extends circumferentially from a flat land at one end to a recess at the opposite end.

10. The apparatus of claim 9 wherein successive ramps are oppositely inclined, each extending downwardly from a flat land to a recess.

11. The apparatus of claim 1 wherein the interior of said bushing is internally configured with circumferentially spaced lobes.

12. The apparatus of claim 1 wherein said sleeve has an external journal surface subdivided by a circular groove into two axially spaced sections, and conduit means for delivering lubricant through said shaft into said groove for distribution to the interfaces between the axially spaced sections of said journal surface and the interior of said bushing.

13. The apparatus of claim 12 wherein said conduit means is additionally operative to deliver lubricant from one of said interfaces to said circular channel.

* * * * *